US012756570B1

(12) United States Patent
Rausenberger

(10) Patent No.: US 12,756,570 B1
(45) Date of Patent: Oct. 6, 2026

(54) SYSTEM AND METHOD FOR CRYPTOGRAPHIC CONTINUITY ASSERTIONS

(71) Applicant: Brad Rausenberger, Jamestown, NC (US)

(72) Inventor: Brad Rausenberger, Jamestown, NC (US)

( * ) Notice: Subject to any disclaimer, the term of this patent is extended or adjusted under 35 U.S.C. 154(b) by 0 days.

(21) Appl. No.: 19/557,074

(22) Filed: Mar. 4, 2026

(51) Int. Cl.
*H04L 9/32* (2006.01)
*H04L 9/08* (2006.01)

(52) U.S. Cl.
CPC .......... *H04L 9/3218* (2013.01); *H04L 9/0891* (2013.01)

(58) Field of Classification Search
CPC ............................ H04L 9/3218; H04L 9/0891
See application file for complete search history.

(56) References Cited

U.S. PATENT DOCUMENTS 11,153,098 B2 * 10/2021 Wentz .................. H04L 9/0861
11,184,766 B1 * 11/2021 Lord ...................... G06V 10/75
11,373,179 B2 * 6/2022 Higgins ............... G06Q 20/385
11,521,213 B2 * 12/2022 Rule .................. G06Q 20/4018
12,231,549 B1 * 2/2025 Stapleton ............. H04L 9/0852
2005/0114666 A1 * 5/2005 Sudia .................... H04L 9/3236
713/175
2009/0113058 A1 * 4/2009 Ou ........................ H04L 47/822
709/227
2016/0092701 A1 * 3/2016 Shah ...................... H04W 4/60
713/189
2019/0312734 A1 * 10/2019 Wentz .................. H04L 9/3239
2020/0067922 A1 * 2/2020 Avetisov ............ H04L 63/0823
2020/0313873 A1 * 10/2020 Mondello ............ H04L 9/0825
2020/0351089 A1 * 11/2020 Wentz .................. H04L 9/3236
2022/0263650 A1 * 8/2022 Falk ...................... H04L 9/0877
2023/0052608 A1 * 2/2023 Wattiau ................ H04L 9/3271
2025/0356725 A1 * 11/2025 Nowak ............... G07F 17/3225
2026/0100639 A1 * 4/2026 Di Carlo ................ H02M 1/32
2026/0127286 A1 * 5/2026 Martintoni ............. G06F 21/57
2026/0163738 A1 * 6/2026 Schneider ............ H04L 9/3218
2026/0163887 A1 * 6/2026 Palkonda ............. H04L 63/105

* cited by examiner

*Primary Examiner* — Gary S Gracia

(57) ABSTRACT

A system and method maintain secure session continuity by using cryptographic material stored in a hardware-based or software-based security module to generate periodic, event-triggered, or server-initiated continuity assertions. A client-side execution environment creates a continuity assertion payload, obtains a cryptographic proof-of-possession from the security module, and transmits or embeds the continuity assertion within client-to-server communication while operating under platform-controlled scheduling, background suspension, timer adjustments, deferred tasks, or network-wake constraints. A remote server may verify the proof-of-possession, evaluate freshness indicators and delivery context, and maintain session validity. Embodiments may include challenge-response exchanges, encrypted payloads, offline handling, reconnection reconciliation, adjustable intervals, and background-execution contexts.

20 Claims, 6 Drawing Sheets

SYSTEM AND METHOD FOR CRYPTOGRAPHIC CONTINUITY ASSERTIONS

FIELD OF THE INVENTION

The present disclosure relates to systems and methods for maintaining secure digital communication sessions. Certain embodiments involve client-side execution environments, such as browsers, mobile applications, desktop applications, background agents, or operating-system-level schedulers, interacting with hardware-associated or software-based security modules to generate cryptographic continuity assertions. These techniques may support server-side enforcement of session continuity and may support protection against unauthorized use of session-related artifacts, including credential misuse, token replay, or other forms of unauthorized session activity.

SUMMARY OF THE INVENTION

The disclosure describes systems and methods in which a client-side execution environment generates recurring, periodic, event-triggered, or server-triggered cryptographic continuity assertions using a cryptographic key stored in a hardware or software security module. The key may be non-exportable or otherwise restricted from extraction. Each continuity assertion includes a cryptographic proof-of-possession, such as a digital signature, message authentication code, attestation artifact, or other cryptographic mechanism demonstrating control of the key. A remote server verifies the proof-of-possession and maintains session validity only upon successful verification.

In some embodiments, the continuity assertion includes a timestamp, nonce, session identifier, rolling counter, monotonic value, or other freshness indicator. The server verifies the cryptographic proof and updates session-related parameters, such as expiration times, trust indicators, counters, or risk scores. If a valid continuity assertion is not received within a defined grace period, or if freshness validation fails, the server terminates the session. These techniques may support continuous, cryptographically enforced session continuity.

In optional embodiments, the server issues a challenge as part of the continuity assertion exchange. The client-side execution environment verifies freshness of the challenge and obtains a cryptographic proof-of-possession from the security module. The techniques described herein may be implemented in browser-based environments, mobile applications, desktop applications, background agents, operating-system-level schedulers, or hybrid configurations. The summary is provided to facilitate understanding and is not intended to limit the scope of the claims.

DETAILED DESCRIPTION OF THE INVENTION

Figure 1:
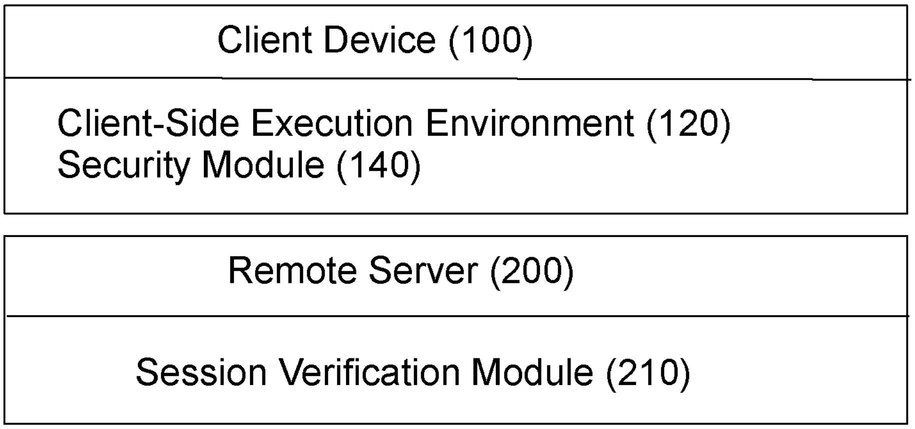
FIG. 1 illustrates a system architecture including a client device, a client-side execution environment, a security module, and a remote server.

The following detailed description presents illustrative embodiments and is not intended to limit the scope of the claims. The embodiments relate to systems and methods in which a client-side execution environment cooperates with a hardware or software security module to generate cryptographic continuity assertions. The continuity assertions may be transmitted or embedded within client-to-server communication, and include a cryptographic proof-of-possession demonstrating that the client device remains present and in control of a non-exportable or extraction-restricted cryptographic key. A remote server verifies the proof-of-possession and maintains session continuity based on verification results.

Definitions

The following terms are provided for clarity and convenience and encompass functional equivalents unless the context indicates otherwise.

- background execution context may refer to any execution environment capable of operating independently of a visible user interface, including browser service workers, browser workers, mobile background tasks, desktop background agents, operating-system-level schedulers, persistent processes, or any other execution context capable of performing logic without requiring active user interaction or a foreground application state.
- challenge may refer to any server-issued or server-derived value used to ensure freshness, authenticity, or non-replay of a cryptographic continuity assertion, including a nonce, timestamp, counter, random value, ephemeral value, or any combination thereof, and may be delivered through any communication mechanism or embedded within any client-server exchange.
- client device may refer to any computing device capable of establishing a session with a remote server, including mobile devices, desktop computers, laptops, tablets, embedded systems, IoT devices, smart appliances, wearables, automotive systems, industrial controllers, or equivalent hardware capable of executing software and communicating over a network.
- client-side execution environment may refer to any execution context capable of performing logic on a client device, including but not limited to web browsers, browser workers, browser service workers, mobile applications, desktop applications, background agents, persistent processes, virtual machines, containers, or operating-system-level schedulers.
- continuity assertion may refer to any periodic, event triggered, server triggered, policy triggered, or embedded cryptographic message generated by the client side execution environment that includes or conveys a cryptographic proof-of-possession demonstrating that the client device remains present, active, and in control of a non exportable or extraction restricted key, whether transmitted as a standalone message or embedded within other client server communications. A continuity assertion is distinct from non cryptographic keepalive or network liveness mechanisms and serves as the canonical term for the cryptographic presence verification mechanisms described herein.

continuity assertion interval may refer to any predetermined, adaptive, dynamic, or policy driven period defining when the client device generates or transmits a continuity assertion, including intervals that vary based on device state, network conditions, risk scoring, or server policy.

cryptographic proof-of-possession may refer to any digital signature, message authentication code, attestation artifact, zero-knowledge proof, or equivalent cryptographic output demonstrating control of a cryptographic key without revealing the key itself, including proofs generated in response to a challenge, proofs generated over a continuity assertion payload, or proofs embedded within other client-server communications.

freshness may refer to any property indicating that a received continuity assertion or proof-of-possession is recent, non-replayed, and generated within an acceptable temporal, sequential, or cryptographic validity window, as determined by timestamps, nonces, counters, monotonic values, ephemeral cryptographic material, challenge-response mechanisms, or equivalent freshness indicators.

grace period may refer to any time window during which the server expects to receive a valid continuity assertion or proof-of-possession to maintain session validity, including fixed, adaptive, dynamic, or risk-adjusted windows.

key may refer to any cryptographic value used for signing, encryption, message authentication, or proof-of-possession, including private keys, symmetric keys, ephemeral keys, session keys, or any equivalent cryptographic secret or non-secret value used within the system.

keypair may refer to any mathematically related pair of cryptographic keys, including a private key and corresponding public key used for digital signatures, encryption, attestation, or proof-of-possession, whether generated by a security module, hardware-backed key store, software-based key container, or any equivalent mechanism.

liveness request may refer to any server-initiated, policy-driven, or system-triggered instruction requiring the client device to generate and transmit a continuity assertion or proof-of-possession, including requests delivered through HTTP, WebSocket, push messaging, polling, long-lived connections, or any other communication mechanism.

liveness signal may refer to a continuity assertion or any cryptographic proof-of-possession transmitted or embedded within client-to-server communication to demonstrate that the client device remains present, active, and in control of a cryptographic key. A liveness signal may include or reference a liveness payload, a cryptographic proof-of-possession, freshness indicators, or other session-continuity information.

liveness payload may refer to any structured data associated with a continuity assertion or liveness signal, including timestamps, nonces, session identifiers, counters, monotonic values, challenge-response values, or other freshness indicators. A liveness payload may be encoded or serialized using JSON, CBOR, protobuf, binary formats, or equivalent representations and may be used as input to a cryptographic proof-of-possession.

local liveness state may refer to any client-maintained indicator of recent cryptographic proof-of-possession activity, including timestamps, counters, or other freshness-related values used to track local liveness independent of server connectivity.

offline state may refer to any condition in which the client device lacks network connectivity or cannot reach the remote server, including intermittent connectivity, airplane mode, network transitions, captive portals, degraded connectivity, or equivalent states in which continuity assertion or liveness signal transmission is deferred until connectivity becomes available . . . risk or trust parameters may refer to any server-maintained indicators used to evaluate the security posture of a session or device, including risk scores, trust levels, anomaly indicators, behavioral indicators, device reputation, authentication history, or equivalent adaptive-authentication metrics.

secondary channel may refer to any authenticated communication mechanism other than the primary session channel, including push-notification transports, operating-system wake mechanisms, or other authenticated communication paths capable of delivering a continuity assertion or liveness signal.

security module may refer to any hardware-isolated, software-isolated, virtualization-isolated, firmware-isolated, cloud-assisted, or hybrid cryptographic component capable of storing a non-exportable or extraction-restricted cryptographic key and performing cryptographic operations including, but not limited to, proof-of-possession operations. The security module may include Trusted Platform Modules (TPMs), Secure Enclaves, StrongBox, secure elements, hardware-isolated key stores, WebCrypto non-extractable keys, virtualization-based security modules, firmware-level isolation modules, cloud-assisted attestation modules, or software-based key containers with export restrictions, as well as any other component or subsystem that enforces non-exportability and serialized, rate-limited, or exclusive-access cryptographic execution.

session continuity token may refer to any server-generated value used to maintain, update, or validate session state, including session identifiers, encrypted tokens, rolling keys, ephemeral session keys, or other session-related cryptographic material.

session-related parameters may refer to any server-maintained values associated with a session, including expiration times, trust indicators, counters, risk scores, rolling sequence numbers, freshness windows, or any other values used to determine session validity or continuity.

System Overview

In certain embodiments, a client device includes a security module and a client-side execution environment. The execution environment obtains cryptographic proofs-of-possession from the security module and generates or embeds cryptographic continuity assertions for transmission to a remote server at predetermined intervals or in response to server-initiated, policy-driven, or event-triggered liveness requests. These techniques may support server-side enforcement of session continuity and may support protection against unauthorized use of session-related artifacts.

In some embodiments, the continuity assertion includes a timestamp, nonce, session identifier, rolling counter, monotonic value, or other freshness indicator. The server verifies the cryptographic proof using a stored public key or verification parameter and updates session-related parameters accordingly. These approaches may support continuous, cryptographically enforced session validity. Freshness indicators may be incorporated into continuity assertion transmission in a manner consistent with server-maintained values, including in environments involving offline intervals, background-execution behaviors, or serialized secure-element execution.

The techniques may operate with session artifacts such as cookies, authorization headers, tokens, or other session identifiers. The server may maintain session validity based on successful verification of the continuity assertion. Optional embodiments may allow the server to adjust trust indicators, risk parameters, expiration times, or other session-related values based on verification results.

The security module may provide non-exportable or extraction-restricted key storage and cryptographic operations. The client-side execution environment may interact with the security module to obtain proofs-of-possession. In some embodiments, the execution environment may perform local validation of continuity assertion structure, freshness indicators, or challenge-response values prior to transmission.

Client-side execution may occur in browser workers, browser service workers, mobile background tasks, desktop agents, persistent background processes, or operating-system-level schedulers. The continuity assertion process may operate independently of user-interface activity.

FIG. 1 illustrates a system architecture including a client device (100) with a client-side execution environment (120) and a security module (140), and a remote server (200) with a session verification module (210).

Figure 2:
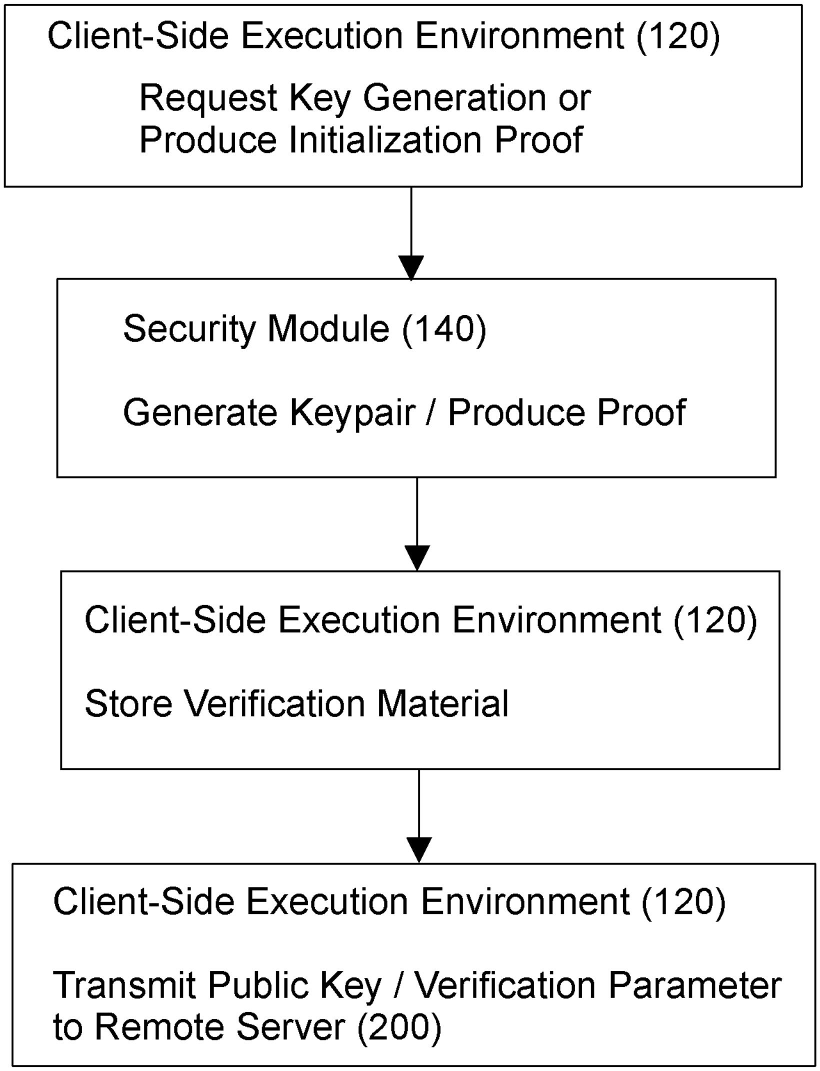
FIG. 2 illustrates an initialization sequence in which the client-side execution environment receives a public key or verification parameter associated with a cryptographic key stored in the security module.

FIG. 2 illustrates an initialization sequence in which the client-side execution environment (120) requests that the security module (140) generate a keypair or produce a cryptographic proof over an initialization challenge. The security module (140) returns the generated keypair or proof to the execution environment (120), which stores associated verification material and transmits a corresponding public key or verification parameter to the remote server (200).

Figure 3:
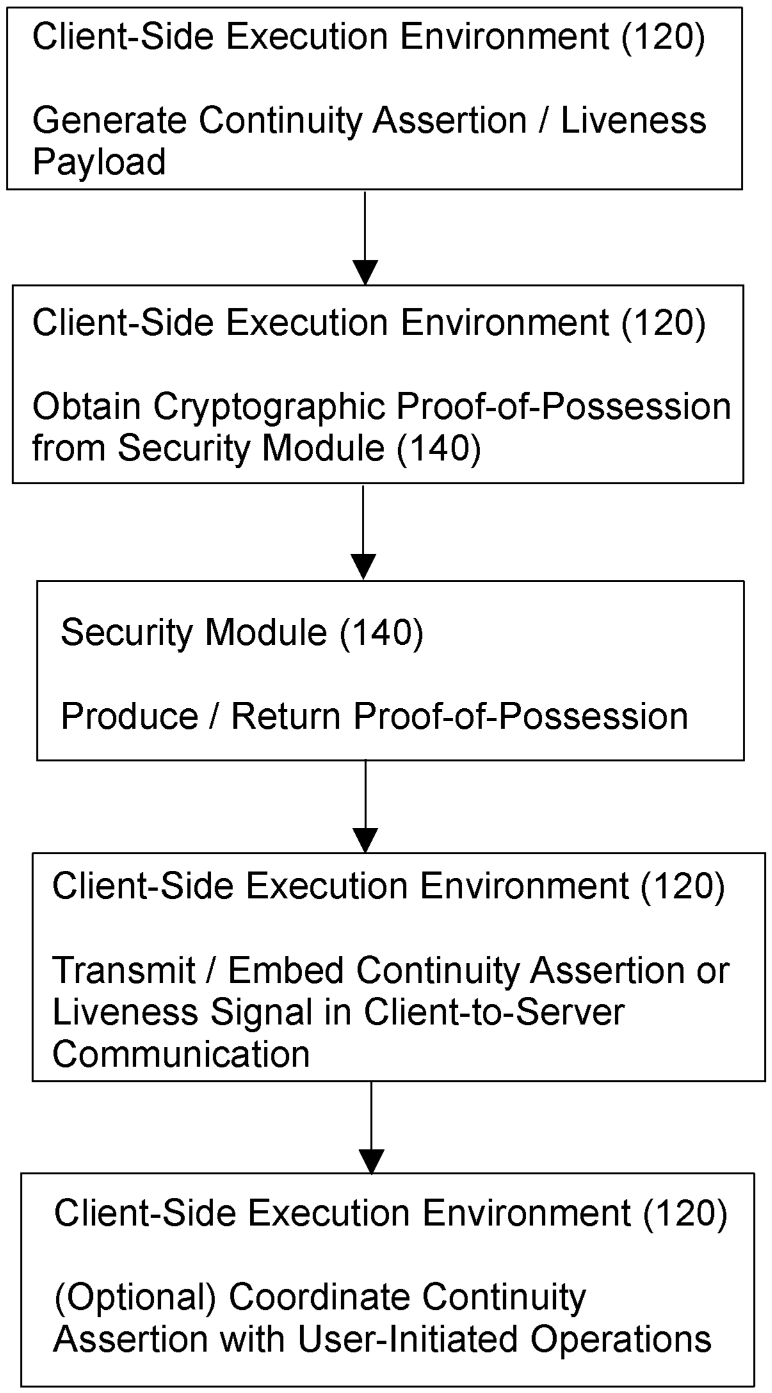
FIG. 3 illustrates a flowchart of a recurring, periodic, event-triggered, or server-triggered cryptographic continuity assertion process executed by the client-side execution environment.

FIG. 3 illustrates a continuity assertion flow in which the client-side execution environment (120) generates a continuity assertion payload, obtains a cryptographic proof-of-possession from the security module (140), and transmits or embeds the continuity assertion or other liveness signal within client-to-server communication. The server verifies the proof and updates session-related parameters.

Figure 4:
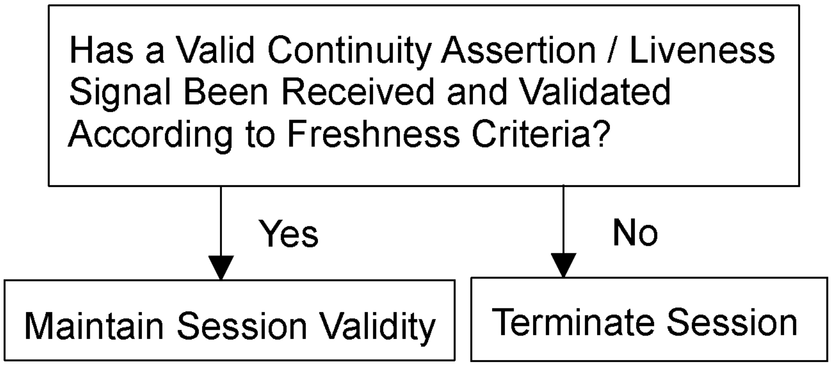
FIG. 4 illustrates server-side logic for determining whether session validity is maintained based on continuity assertion timing, freshness validation, and proof-of-possession verification.

FIG. 4 illustrates server-side logic in which the server (200) determines whether a valid continuity assertion or other liveness signal has been received either within a defined grace period or in response to a server-initiated or event-triggered liveness request, maintains session validity when freshness validation succeeds, and terminates the session when validation fails.

Figure 5:
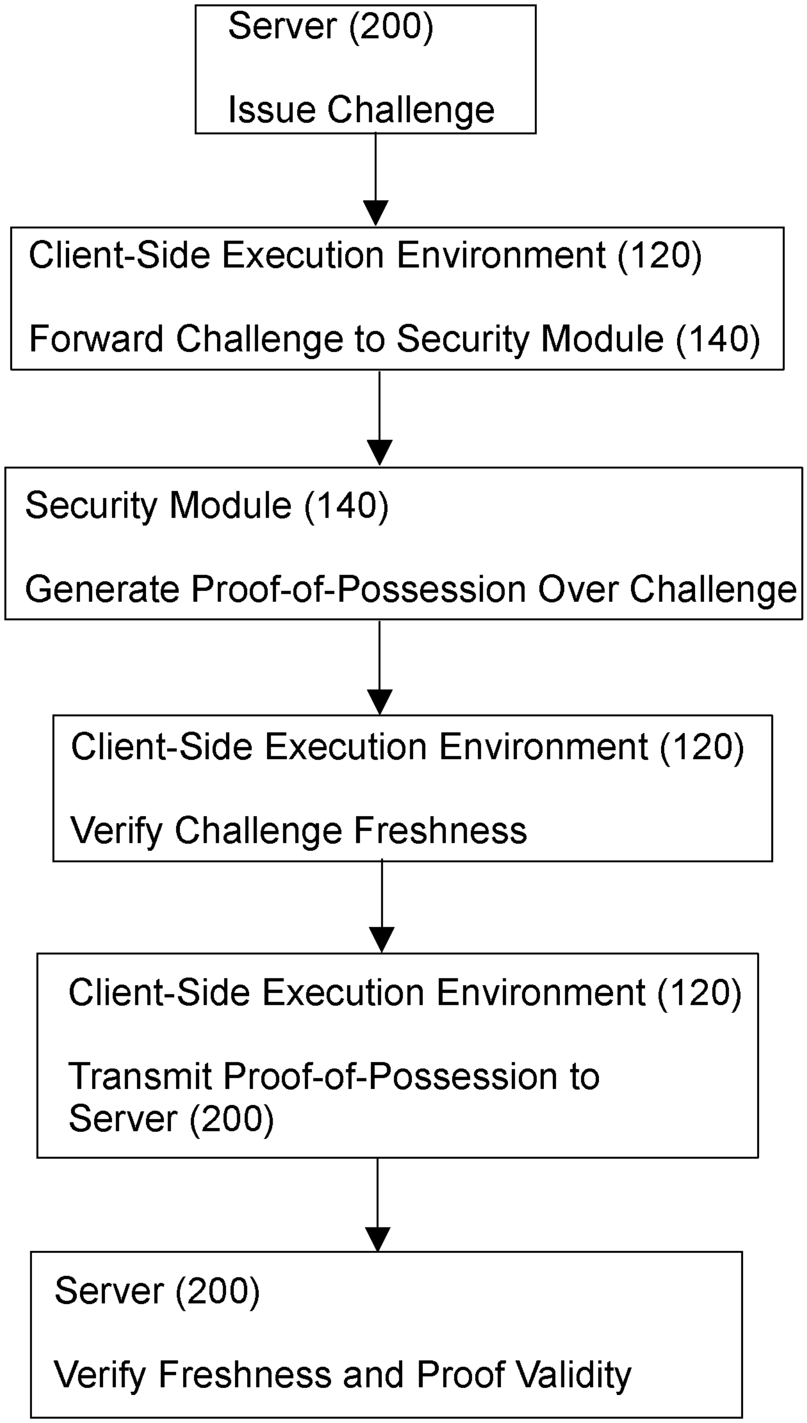
FIG. 5 illustrates a configuration in which the server issues a challenge and the security module generates a corresponding proof-of-possession.

FIG. 5 illustrates a configuration in which the server (200) issues a challenge, the security module (140) generates a proof-of-possession over the challenge, and the execution environment (120) verifies freshness prior to transmission.

Figure 6:
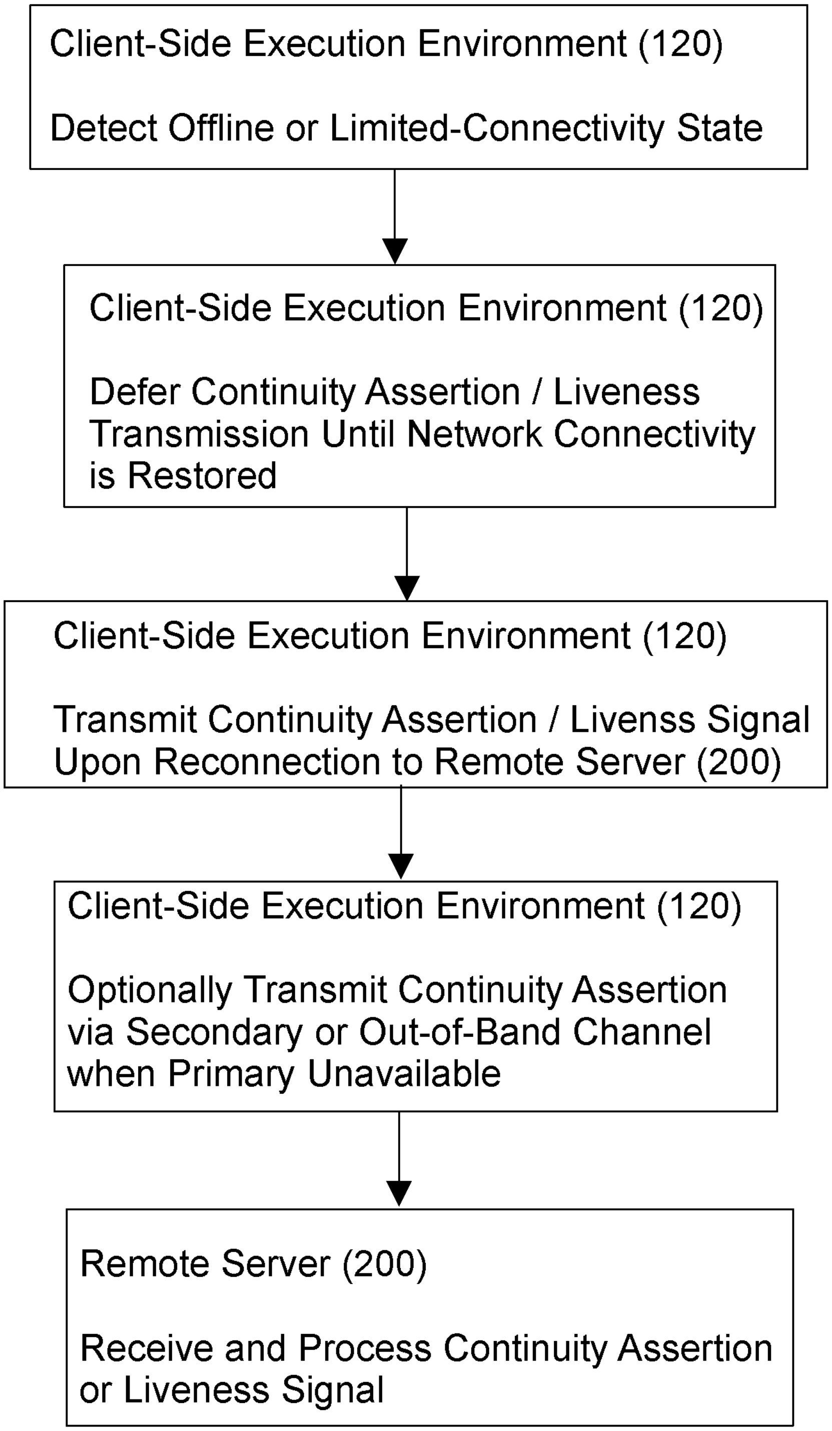
FIG. 6 illustrates a configuration in which the client device detects an offline condition, defers continuity assertion transmission until connectivity is restored, and transmits a continuity assertion through a secondary or out-of-band communication channel when the primary channel is unavailable.

FIG. 6 illustrates a configuration in which the client-side execution environment (120) detects an offline or limited-connectivity state of the client device (100), defers transmission of a cryptographic continuity assertion or other liveness signal until network connectivity is restored, and may transmit a continuity assertion via a secondary or out-of-band communication channel to the remote server (200) when the primary channel is unavailable.

Reconnection and Server Validation

In some embodiments, upon restoration of network connectivity, the execution environment may transmit or embed a cryptographic continuity assertion to the remote server within an offline grace period defined by server policy. The signal may include a timestamp, nonce, session identifier, rolling counter, or other freshness indicator, along with a cryptographic proof-of-possession. The server may verify the proof and determine whether the signal was received within the permitted offline grace window.

Upon reconnection, the execution environment may transmit the most recent continuity assertion payload or a subset of locally generated payloads, depending on server policy. The server may evaluate whether the received payload satisfies freshness requirements and may disregard payloads that fall outside the permitted grace window. These interactions may support reconnection behavior, may support protection against replay of stale proofs, and may support handling of offline intervals.

Server Enforcement After Offline Period

In some embodiments, if the continuity assertion is received within the offline grace period and freshness validation succeeds, the server may maintain session validity. If the signal is not received within the permitted window, or if freshness validation does not succeed, the server may terminate the session. These interactions may support session-continuity behavior across periods of limited connectivity.

Adaptive Offline Grace Period

In certain embodiments, the server may adjust the offline grace period dynamically based on device trust level, recent authentication events, anomaly-detection indicators, or risk-evaluation logic. These adjustments may support adaptive session handling in environments with variable network conditions.

Server-Assisted Session Adjustments

In some implementations, the server may use verified continuity assertion information to adjust session duration, rotate session keys or tokens, update trust or risk indicators, or perform other session-related operations. Applicability may vary depending on system design.

Coexistence With Local Evaluation

In certain embodiments, server-assisted verification may coexist with local evaluation performed by the client-side execution environment. These combined approaches may support deployment models in which both client and server maintain liveness-related state. These coordination mechanisms may operate across conditions such as serialized secure-element execution, background-execution behavior, intermittent connectivity, and multi-channel delivery.

Hybrid Embodiment

In one implementation, the client-side execution environment performs local evaluation of a cryptographic continuity assertion while also transmitting or embedding the signal within client-to-server communication. The execution environment may maintain an internal liveness state based on local evaluation, and the server may update session-related parameters based on its own verification. These interactions may operate alongside serialized secure-element execution, background-execution behavior, intermittent connectivity, and multi-channel delivery.

In some implementations, both the client-side execution environment and the server participate in determining session continuity. The execution environment may track local timing, freshness indicators, or event-triggered generation of continuity assertions, while the server maintains session validity based on successful verification. These coordination mechanisms may span conditions including serialized secure-element execution, background-execution behavior, intermittent connectivity, and multi-channel delivery.

In certain embodiments, the hybrid approach allows the client-side execution environment to maintain device-associated liveness information independently while enabling optional server-side use of verified signals. These techniques may support a range of deployment preferences and security requirements.

In one embodiment, the client-side execution environment may maintain a local liveness counter or timestamp that is updated whenever a cryptographic proof-of-possession is generated, regardless of whether the proof is immediately transmitted. The server may maintain its own liveness-related state and may incorporate the received continuity assertion information into its evaluation. These interactions may support coordinated session handling, may support operation during intermittent connectivity, and may support deployment models in which local and server-side evaluation coexist.

Certain embodiments may operate under environmental conditions such as serialized secure-element execution, background-execution behavior, or intermittent connectivity, which may influence the timing or availability of cryptographic operations. In some cases, serialized secure-element execution may coincide with background execution or user-initiated signing operations, and coordinated handling may support continuity assertion generation under such conditions.

Continuity Assertion Payload Structure

In one embodiment, a continuity assertion payload may include a timestamp, nonce, session identifier, rolling counter, monotonic sequence number, or other freshness indicator. The timestamp may indicate when the payload was generated, the nonce may support non-replay characteristics, and the session identifier may reference the associated session. These freshness indicators may be incorporated into continuity assertion transmission in a manner consistent with server-maintained values, including in environments involving offline intervals, background-execution behavior, or serialized secure-element execution.

In some embodiments, the continuity assertion payload may be represented using a structured format such as JSON, CBOR, protobuf, or a binary message container. The payload may include fields such as "ts": 1712345678, "nonce": "abc123", "sid": "session-xyz", or "ctr": 42, and may be encoded or serialized according to platform capabilities. These representations may support interoperability across heterogeneous client environments, may support consistent parsing or validation by the server, and may support compatibility with existing message-serialization frameworks.

In certain embodiments, the cryptographic proof-of-possession may be generated using a signature mechanism, message-authentication mechanism, attestation mechanism, or other cryptographic process supported by the security module. The resulting proof may be represented as a detached signature, an embedded signature field, or an authenticated message envelope. These structures may support verification across diverse cryptographic libraries, may support compatibility with hardware-associated key stores, and may support integration with server-side verification pipelines.

In some embodiments, the payload may be accompanied by a cryptographic proof-of-possession generated using a non-exportable or extraction-restricted key stored in a hardware or software security module. The corresponding public key, symmetric key, attestation parameter, or verification material may be stored locally or transmitted to a server for verification. These structures may support cryptographic validation.

Server-Side Verification and Session Handling

In some embodiments, a remote server verifies the cryptographic proof-of-possession contained in each continuity assertion. When a valid signal is received within a defined grace period or liveness window, the server may maintain session validity. When a valid signal is not received or freshness validation does not succeed, the server may terminate the session. These operations may support continuous session-continuity behavior.

In some embodiments, the server may associate a received continuity assertion with a session identifier, device identifier, key identifier, or combination thereof. The association may be derived from values included in the continuity assertion payload or from server-maintained session state. These interactions may support consistent session-continuity handling, may support validation of device-associated proofs, and may support applicability across systems using different forms of session identifiers.

In one embodiment, the server may perform a multi-step verification sequence that includes parsing the continuity assertion payload, validating freshness indicators, verifying the cryptographic proof-of-possession using a stored public key or verification parameter, and updating session-related parameters. The server may further evaluate replay-prevention values such as counters or monotonic timestamps and may record verification outcomes for audit or anomaly-detection purposes. These operations may support consistent enforcement of session-continuity policies and may support protection against replay or tampering.

In certain embodiments, the server may maintain a rolling sequence number, counter, monotonic timestamp, or other freshness-tracking value associated with the continuity assertion. The server may store verification events for audit, anomaly detection, or risk evaluation. These freshness indicators may be incorporated in a manner consistent with server-maintained values, including in environments involving offline intervals, background-execution behavior, or serialized secure-element execution.

In some implementations, the server may issue a challenge as part of the continuity assertion exchange. The security module may generate a cryptographic proof-of-possession over the challenge, and the client-side execution environment may verify challenge freshness prior to transmission. These interactions may support validation of message freshness and authenticity.

In certain embodiments, the server may update session-related trust indicators, risk parameters, or adaptive-authentication settings based on continuity assertion verification. These updates may support dynamic session handling.

Offline Handling

In some embodiments, the client-side execution environment may detect an offline state of the device. When offline, the execution environment may defer transmission or embedding of the continuity assertion until network connectivity is restored. These operations may support continuity of liveness-related processing during temporary connectivity loss. These offline conditions may occur concurrently with serialized secure-element execution or background-execution behavior, and coordinated maintenance of freshness indicators may support deferred-transmission behavior.

In certain implementations, upon reconnection, the execution environment may transmit a cryptographic continuity assertion within an offline grace period. The server may maintain or terminate session validity based on whether the signal is received within the defined window. Applicability may vary depending on system design. These offline conditions may overlap with serialized secure-element execution or background-execution behavior, and coordinated maintenance of freshness indicators may support deferred-transmission behavior.

In certain embodiments, the server may evaluate whether a received continuity assertion is malformed, contains an invalid signature, or includes freshness indicators outside an acceptable range. The server may disregard such signals, update risk or trust parameters, or terminate the associated session depending on system policy. These operations may support protection against replay or tampering and may support adaptive session handling across environments with varying security requirements.

In some embodiments, during an offline period, the client-side execution environment may continue generating continuity assertion payloads or freshness indicators locally, including timestamps, nonces, rolling counters, monotonic sequence numbers, or other liveness-related values. The execution environment may obtain cryptographic proofs-of-possession from a hardware or software security module using a non-exportable or extraction-restricted key. These operations may support local liveness-related continuity when transmission to the server is temporarily unavailable. These offline conditions may occur alongside serialized secure-element execution or background-execution behavior, and coordinated maintenance of freshness indicators may support deferred-transmission behavior. Freshness indicators generated during offline operation may be incorporated in a manner consistent with server-maintained values when background-execution behavior or serialized secure-element execution also occur.

In some embodiments, during offline operation the client-side execution environment may generate a sequence of locally stored continuity assertion payloads, each containing a timestamp, counter, or other freshness indicator. These payloads may be stored in a secure local buffer until network connectivity is restored. These techniques may support continuity of liveness-related state during offline periods, may support deferred validation by the server, and may support environments with intermittent or unreliable connectivity. These offline conditions may coincide with serialized secure-element execution or background-execution behavior, and coordinated maintenance of freshness indicators may support deferred-transmission behavior.

Background Execution Context

In some embodiments, the continuity assertion process may be executed within a background-execution context, such as a browser service worker, browser worker, mobile background task, desktop agent, persistent background process, or operating-system-level scheduler. This may allow the process to operate independently of user-interface activity. These background-execution behaviors may occur concurrently with serialized secure-element execution or offline intervals, and coordinated scheduling of cryptographic operations may support continuity assertion generation.

In certain implementations, background execution may reduce interaction with user-facing components and may support uninterrupted continuity assertion processing during periods of user inactivity. Applicability may vary depending on platform capabilities. These background-execution behaviors may coincide with serialized secure-element execution or offline intervals, and coordinated scheduling of cryptographic operations may support continuity assertion generation.

Certain embodiments may operate in environments where secure-element access is serialized, background execution may be suspended by the operating system, and network connectivity may be intermittent. These conditions may influence the timing or availability of cryptographic operations used for continuity assertion generation.

Technical Effects

In some embodiments, cryptographic proofs-of-possession may be generated by a hardware or software security module within a client-side execution environment. This may support session-continuity behavior based on device-associated cryptographic liveness.

In certain embodiments, a server may maintain session validity based on periodic, event-triggered, or server-triggered verification of cryptographic continuity assertions. This may support applicability across diverse session-management environments.

In some implementations, optional challenge-response exchanges may support validation of message freshness and authenticity.

In various embodiments, the techniques described herein address computer-specific technical challenges arising from secure-element serialization, operating-system background-execution suspension, intermittent network availability, and multi-channel communication paths. These challenges result from hardware-enforced execution characteristics, operating-system scheduling behavior, and cryptographic key-isolation properties that affect the timing and availability of cryptographic operations. The techniques described herein coordinate secure-element access, freshness-indicator maintenance, and continuity assertion transmission in a manner compatible with these platform-level conditions, enabling deterministic cryptographic operation and authenticated session-continuity behavior under conditions that inherently arise in computing environments.

In certain embodiments, encrypted continuity assertion payloads may be generated using session-specific symmetric keys, ephemeral keys, or other negotiated cryptographic material. This may support confidentiality of transmitted information.

In some embodiments, the continuity assertion payload may be encrypted using a session-specific symmetric key, an ephemeral key derived from a key-exchange protocol, or other negotiated cryptographic material. The encrypted payload may include metadata indicating the encryption scheme or key identifier used for decryption. These approaches may support confidentiality of transmitted information, may support compatibility with secure-channel negotiation mechanisms, and may support protection of liveness-related data against unauthorized inspection.

In some embodiments, the server may rotate session-specific keys, ephemeral keys, or other cryptographic material upon successful verification of a continuity assertion. The client-side execution environment may obtain updated key material through a secure channel or derive new values using previously established parameters. These interactions may support confidentiality of transmitted information, may support protection against replay or key reuse, and may support applicability across systems that employ periodic or event-triggered key rotation.

In certain embodiments, the client device and server may derive session-specific symmetric material, ephemeral material, or other cryptographic values using a key-derivation process capable of producing shared or derived cryptographic material. The derived values may be used to encrypt continuity assertion payloads, authenticate messages, or generate proof-of-possession values. These techniques may support compatibility with diverse cryptographic libraries, may support generation of session-specific material, and may support integration with systems that rely on derived values rather than static key storage.

In some embodiments, the client device and server may negotiate ephemeral cryptographic keys using a key-exchange mechanism capable of establishing shared cryptographic material between the parties. The negotiated keys may be used to protect continuity assertion payloads, freshness indicators, or other liveness-related information. These interactions may support confidentiality of transmitted data, may support forward-secrecy characteristics, and may support applicability across environments that employ ephemeral key negotiation for authenticated communication.

In some implementations, background execution of continuity assertion tasks may support continuous operation across a range of device and platform configurations.

In some embodiments, the techniques described herein may support session-continuity behavior by associating continuity assertions with cryptographic proofs generated using non-exportable or extraction-restricted keys. These approaches may support protection against replay, token reuse, or unauthorized continuation of a session, and may support device-associated evaluation of session presence across background-execution contexts, offline conditions, or environments with serialized secure-element execution. Certain embodiments may further support coordinated handling of cryptographic operations in a manner compatible with hardware-based or software-based security modules.

Environmental Execution Conditions

Certain embodiments may operate in computing environments that exhibit a variety of operational conditions influencing the timing, ordering, or availability of cryptographic operations. For example, some hardware-backed or software-based security modules may perform cryptographic operations in a serialized manner, permitting only one signing, attestation, or proof-generation operation at a time. Background-execution contexts such as browser service workers, mobile background tasks, desktop agents, or operating-system-level schedulers may be suspended, deferred, or throttled by the operating system, which may affect when continuity assertion logic is executed.

Network availability may vary over time, and intermittent connectivity may result in continuity assertion payloads being generated locally before transmission becomes possible. During such intervals, the client-side execution environment may maintain monotonic freshness indicators, counters, timestamps, or other liveness-related values until connectivity is restored.

Some computing environments may support multiple authenticated communication channels, including primary session channels and secondary or out-of-band channels. These channels may differ in availability, timing, or delivery characteristics, and continuity assertion transmission may incorporate channel-specific metadata to maintain cryptographic binding to device-associated key material.

User-initiated cryptographic operations may occur concurrently with background-initiated continuity assertion generation. In environments where secure-element access is serialized, these operations may be scheduled in a manner that preserves availability for both user-initiated and background tasks.

These environmental execution conditions may arise independently or simultaneously and may interact in ways that shape when cryptographic proofs can be generated, when continuity assertion payloads can be transmitted, and how freshness indicators are maintained. Coordinated handling of these operational conditions may support continuity assertion generation, signing, and delivery in a manner consistent with session-continuity requirements across diverse device and platform environments.

In certain implementations, a secondary or out-of-band communication channel may be available for authenticated delivery of continuity assertions when the primary session channel is unavailable, suspended, or operating in a backgrounded state. The secondary channel may be associated with the same device-linked cryptographic key or verification parameter. These channels may differ in timing or delivery characteristics, and continuity assertion transmission may incorporate channel-specific metadata to maintain cryptographic binding across communication paths.

Some embodiments may coordinate secure-element access across user-initiated cryptographic operations and background continuity assertion generation. This coordination may reflect serialized secure-element execution characteristics, background-execution behaviors, or other operational conditions that influence when cryptographic operations are performed.

These operational conditions may influence how continuity assertion logic is scheduled or executed within the client-side execution environment.

Certain computing environments may involve combined operational conditions in which serialized secure-element execution, background-execution suspension, intermittent connectivity, and multi-channel communication paths occur simultaneously.

Some embodiments may provide coordinated handling of these combined operational conditions so that cryptographic continuity assertion operations remain available across diverse device and platform environments.

Certain computing environments may exhibit a combination of operational characteristics that influence the timing, ordering, or availability of cryptographic operations. These characteristics may include serialized access behavior of hardware-backed or software-based security modules, operating-system behaviors that suspend or defer background execution, variations in network availability, and the presence of multiple authenticated communication channels with differing delivery properties. These characteristics may arise independently or simultaneously and may interact in ways that shape when cryptographic proofs are generated, when continuity assertion payloads are transmitted, and how freshness indicators are maintained. Coordinated handling of these operational characteristics may support continuity assertion generation, signing, and delivery in a manner consistent with session-continuity requirements across heterogeneous device and platform environments.

In some embodiments, the client-side execution environment may coordinate continuity assertion generation under conditions involving serialized secure-element execution, including exclusive-access queue saturation or back-pressure when multiple cryptographic operations are requested concurrently, and may schedule continuity assertion signing operations to avoid contention with user-initiated cryptographic operations. Certain operating systems may apply background-execution suspension, timer coalescing, deferred network-wake events, throttled background timers, or delayed execution windows, and the continuity assertion logic may defer cryptographic operations until execution resumes and adjust timing in accordance with platform-controlled behaviors. During offline intervals, the client device may maintain rollback-resistant monotonic freshness indicators in a secure local buffer and reconcile these indicators with server-maintained freshness values upon reconnection. In environments supporting multiple authenticated communication channels, including primary session channels and secondary or out-of-band channels, continuity assertion transmission may include channel-binding metadata identifying the delivery context associated with the device or session. These operational conditions may arise concurrently and may interact with one another, and the client-side execution environment may coordinate continuity assertion generation, signing, and delivery across intermittent connectivity, background-execution characteristics, serialized secure-element behavior, and platform-controlled scheduling constraints in a manner compatible with heterogeneous device and platform environments.

Coordinated Handling of Combined Operational Conditions

Certain computing environments may involve multiple operational conditions that occur simultaneously, including serialized secure-element execution, background-execution suspension, intermittent or variable network connectivity, and the presence of multiple authenticated communication channels. These conditions may arise independently or in combination and may influence the timing, ordering, or availability of cryptographic operations used to generate continuity assertions.

In some environments, secure-element modules perform cryptographic operations in a serialized manner. When a user-initiated signing operation occurs concurrently with a background-initiated continuity assertion request, the secure element may process these operations sequentially. Background-execution contexts such as browser service workers, mobile background tasks, desktop agents, or operating-system-level schedulers may be suspended, deferred, or throttled by the operating system, which may influence when continuity assertion logic is executed.

Network availability may vary over time, and intermittent connectivity may result in continuity assertion payloads being generated locally before transmission becomes possible. During such intervals, the client-side execution environment may maintain monotonic freshness indicators, counters, timestamps, or other liveness-related values until connectivity is restored. Upon reconnection, these values may be incorporated into continuity assertion transmission in a manner consistent with server-maintained freshness indicators.

Some computing environments may support multiple authenticated communication channels, including primary session channels and secondary or out-of-band channels. These channels may differ in availability, timing, or delivery characteristics, and continuity assertion transmission may incorporate channel-specific metadata to maintain cryptographic binding to device-associated key material.

These combined operational conditions may interact in ways that shape when cryptographic proofs are generated, when continuity assertion payloads are transmitted, and how freshness indicators are maintained. Coordinated handling of these operational conditions may support continuity assertion generation, signing, and delivery in a manner consistent with session-continuity requirements across diverse device and platform environments.

Non-Obviousness Considerations

The coordinated operation of the client-side execution environment, secure-element-associated key material, and the remote server may give rise to technical behaviors in environments that exhibit serialized secure-element execution, background-execution scheduling characteristics, intermittent network availability, and multiple authenticated communication channels. In some embodiments, these coordinated interactions may support session-continuity mechanisms based on cryptographic proofs-of-possession by enabling use of non-exportable keys within the client device while allowing continuity assertion generation to occur alongside user-initiated cryptographic operations, maintaining locally generated continuity assertion payloads during periods of limited connectivity, and incorporating channel-specific metadata into continuity assertion transmission.

The coordinated handling of serialized secure-element execution, background-execution suspension, intermittent connectivity, and multi-channel delivery reflects a combination of operational conditions that arise simultaneously in certain computing environments. These conditions impose timing, availability, and execution characteristics that interact with one another, and the techniques described herein provide mechanisms for coordinating cryptographic operations, freshness-indicator maintenance, and authenticated continuity assertion transmission under such combined conditions. The coordinated behavior enables deterministic and reliable continuity assertion generation and verification across heterogeneous device and platform environments.

In certain embodiments, coordinated interactions among the client-side execution environment, secure-element-associated cryptographic key material, and the remote server may support technical behaviors in environments where secure-element operations are performed sequentially, background execution is influenced by operating-system scheduling, and network conditions vary over time. These factors may give rise to combined operational conditions involving cryptographic processing, background execution, and connectivity variability, and the coordinated architecture may support operation across diverse device and platform environments.

The techniques described herein may support operation under these combined conditions by coordinating secure-element access across user-initiated and background-initiated cryptographic operations, maintaining liveness-related state during periods of limited or unavailable connectivity, incorporating freshness indicators upon reconnection in a manner consistent with server-maintained values, and enabling authenticated delivery of continuity assertions across heterogeneous communication channels.

In some embodiments, these coordinated interactions may support technical behaviors such as managing secure-element access across concurrent cryptographic operations, maintaining monotonic freshness across offline intervals, enabling authenticated delivery when primary communication channels are unavailable, and supporting liveness evaluation when client-side execution occurs in backgrounded or suspended states.

Certain embodiments may operate in environments where secure-element execution is sequential, background execution is subject to operating-system scheduling, and network connectivity varies. The techniques described herein may support coordinated operation under these conditions by aligning cryptographic operations with available secure-element execution windows, maintaining liveness-related state during offline intervals, and generating continuity assertion payloads in a manner compatible with background-execution characteristics.

Certain computing environments may involve combined operational conditions such as serialized secure-element execution, background-execution scheduling, intermittent connectivity, and multi-channel communication paths. The techniques described herein may support coordinated operation under these conditions by managing cryptographic operations across user-initiated and background contexts, maintaining liveness-related state during periods of limited connectivity, and incorporating channel-specific metadata into continuity assertion transmission.

In some embodiments, coordinated behaviors among the client-side execution environment, secure-element-associated key material, and the remote server may support operation in environments involving sequential cryptographic execution, background-execution behaviors, and variable connectivity.

These coordinated interactions may support technical behaviors such as maintaining monotonic freshness across offline intervals, supporting authenticated delivery across available communication channels, and supporting liveness evaluation during background execution.

Alternative Embodiments

In some embodiments, a cryptographic continuity assertion may be embedded within existing client-to-server communication rather than transmitted as a standalone message. The proof-of-possession may be included within HTTP headers, WebSocket frames, streaming channels, or other multiplexed communication paths. These approaches may support liveness evaluation without requiring dedicated continuity assertion transmissions.

In certain embodiments, liveness evaluation may occur on a per-request basis. Each client request may include a cryptographic proof-of-possession generated using a non-exportable or extraction-restricted key, and the server may maintain session validity based on verification of individual requests. These techniques may support environments in which periodic intervals are not utilized.

In certain embodiments, each client-initiated request may include a cryptographic proof-of-possession generated over request-specific data such as a nonce, timestamp, or request hash. The server may treat each verified request as satisfying a liveness requirement and may update session-related parameters accordingly. These techniques may support environments in which periodic or background continuity assertions are not preferred and may support liveness evaluation aligned with user-initiated operations.

In some implementations, continuity assertion signals may be generated or delivered through authenticated communication channels including primary session channels (e.g., HTTPS/TLS connections) and secondary or out-of-band channels (e.g., push-notification services, server-initiated callbacks, or background messaging frameworks). The authenticated delivery channel may expose channel-binding metadata such as TLS session identifiers, QUIC connection identifiers, WebSocket connection identifiers, HTTP/2 stream identifiers, or other protocol-level identifiers associated with the underlying secure transport. Continuity assertion signals may also be generated in response to push notifications, server-initiated callbacks, or long-lived connections such as WebSocket, HTTP/2, or QUIC streams, and the server may coordinate timing or triggering of liveness evaluation through any of these channels.

In certain embodiments, the techniques described herein may be applied to IoT devices, embedded systems, automotive systems, industrial controllers, or other computing environments. The client-side execution environment may operate within firmware-level components or lightweight runtimes while generating cryptographic proofs-of-possession. These approaches may support deployment across diverse hardware platforms.

In some embodiments, attestation mechanisms supported by the security module may be used as the cryptographic proof-of-possession. Such attestation outputs may be incorporated into continuity assertion payloads to provide device-associated information. These techniques may support integration with attestation-capable infrastructures.

In certain implementations, session continuity may be maintained using ephemeral session keys or rolling cryptographic material derived from periodic or event-triggered proofs-of-possession. The server may update session-related parameters based on verification of these values. These operations may support confidentiality and non-replay characteristics.

In some embodiments, the client-side execution environment may coordinate generation or transmission of cryptographic continuity assertions with user-initiated actions. The coordination may include serializing cryptographic operations, prioritizing user-initiated signing requests, deferring continuity assertion creation during specific user actions, or treating a user-initiated request containing a cryptographic proof-of-possession as satisfying a continuity assertion requirement. These coordination mechanisms may operate across conditions such as serialized secure-element execution, background-execution behaviors, intermittent connectivity, and multi-channel communication.

In some embodiments, a user-initiated action such as approving a transaction, signing a message, or performing an authenticated request may generate a cryptographic proof-of-possession that satisfies a continuity assertion requirement. The client-side execution environment may detect that the user-initiated operation includes a valid proof and may update local liveness state accordingly. These interactions may support environments in which user activity produces cryptographic proofs and may support coordinated scheduling of secure-element access.

In additional embodiments, the client-side execution environment may operate within a native application, desktop agent, operating-system-level background service, virtual machine, containerized runtime, or firmware-level component. The cryptographic key may be stored or accessed through hardware-associated secure modules or software-based non-exportable key containers, including implementations operating on devices without hardware-backed secure storage. These embodiments may support deployment across heterogeneous device types and execution environments.

In some embodiments, the client-side execution environment may support multi-channel delivery of cryptographic continuity assertions. A primary session channel may be used when available, while secondary channels such as push-notification transports, operating-system wake mechanisms, or other authenticated communication paths may be used when the primary channel is suspended or backgrounded. The continuity assertion may include attestation information associated with the client-side execution environment. The client device may also apply rate-management techniques to continuity assertion generation or transmission. These mechanisms may operate across diverse network conditions, device states, and execution environments and may be compatible with secure-element execution characteristics and server-defined session-continuity policies.

In certain embodiments, when a secondary or out-of-band channel is used, the continuity assertion may include an identifier indicating the channel type or delivery context.

The server may validate that the secondary channel is authenticated, associated with the same device or session, and consistent with freshness requirements. These mechanisms may support continuity assertion delivery across heterogeneous communication paths.

Certain computing environments may apply behaviors such as timer coalescing, deferred task scheduling, throttled background timers, or delayed network-wake events, and some security modules may impose queueing or backpressure when multiple cryptographic operations are requested concurrently due to exclusive-access execution characteristics. Continuity assertions may be transmitted across different authenticated communication channels and may include channel-binding metadata identifying the delivery context associated with the device or session. During offline intervals, freshness indicators may be maintained in a rollback-resistant local buffer that preserves monotonic ordering, and these indicators may be reconciled with server-maintained values when connectivity becomes available. These operational conditions may arise independently or simultaneously and may influence when continuity-related logic is executed or transmitted within the client-side execution environment.

In some embodiments, the client-side execution environment may support coordinated handling of secure-element access across user-initiated and background-initiated cryptographic operations, may support maintenance of cryptographic liveness during operating-system suspension intervals, may support preservation and reconciliation of monotonic freshness indicators across offline periods, may support authenticated delivery of continuity assertions with channel-binding metadata across multiple communication paths, and may support resolution of execution conditions arising from serialized secure-element behavior, background-execution characteristics, intermittent connectivity, and multi-channel delivery in a manner compatible with continuity assertion generation and transmission.

General Statement of Scope

The embodiments described herein are illustrative and not intended to limit the scope of the claimed subject matter. Variations, modifications, and alternative implementations fall within the scope of the claims.

In some embodiments, the techniques described herein may be implemented using different types of security modules, client-side execution environments, cryptographic mechanisms, or session-management systems. The structures and sequences described represent examples of possible implementations.

The scope of the claimed subject matter is defined solely by the claims and encompasses embodiments that differ from the examples provided in the detailed description.

What is claimed is:

1. A system for maintaining secure session continuity between a client device and a remote server, the system comprising:

a hardware-backed or software-based security module on the client device configured to store a non-exportable or extraction-restricted cryptographic key and to perform cryptographic operations in a serialized manner consistent with exclusive-access execution characteristics;

a client-side execution environment configured to operate in foreground and background execution states and subject to platform-controlled behaviors such as background-execution suspension, timer adjustments or coalescing, deferred task or network scheduling, network-wake constraints, or other operating-system-imposed execution conditions;

the client-side execution environment further configured to generate a continuity assertion payload including a timestamp, counter, nonce, monotonic value, or other freshness indicator, and to maintain freshness indicators during offline intervals using mechanisms that preserve monotonic ordering;

the client-side execution environment further configured to obtain, from the security module, a cryptographic proof-of-possession over the continuity assertion payload, including coordinating secure-element access with user-initiated cryptographic operations and serialized secure-element execution characteristics;

the client-side execution environment further configured to transmit or embed a cryptographic continuity assertion within client-to-server communication at a predetermined interval or in response to a server-initiated or event-triggered liveness request, including authenticated delivery over one or more communication channels having differing availability, timing, or platform-controlled wake characteristics;

the client-side execution environment further configured to reconcile locally maintained freshness indicators with server-maintained freshness indicators upon reconnection, including transmission of a continuity assertion within a server-defined or otherwise applicable freshness-validation window;

and the remote server configured to verify the cryptographic proof-of-possession, evaluate freshness indicators, evaluate delivery-context information, and maintain session validity based on successful verification.

2. The system of claim 1, wherein the client-side execution environment detects serialized secure-element access, including exclusive-access queue saturation conditions, and schedules continuity assertion generation to avoid contention with user-initiated cryptographic operations and to preserve deterministic secure-element availability.

3. The system of claim 1, wherein the cryptographic continuity assertion is generated by a background-execution context including a browser service worker, mobile background task, operating-system-level scheduler, desktop agent, virtual-machine process, containerized runtime, or firmware-level component, the background-execution context being subject to platform-controlled suspension, throttling, or deferred-execution behavior.

4. The system of claim 1, wherein the remote server rotates one or more session-encryption keys, ephemeral keys, or session-continuity tokens upon successful verification of the cryptographic continuity assertion, and updates session-related trust or risk indicators based on verification outcomes.

5. The system of claim 1, wherein the cryptographic key is stored in a Trusted Platform Module, Secure Enclave, StrongBox, hardware-isolated secure element, or software-based non-exportable key container that enforces serialized or exclusive-access cryptographic execution.

6. The system of claim 1, wherein the continuity assertion payload includes a timestamp, nonce, session identifier, rolling counter, monotonic value, or combination thereof, and wherein the remote server verifies freshness based on the payload and server-maintained freshness-tracking values.

7. The system of claim 1, wherein the remote server terminates the session when a cryptographic continuity assertion is not received within a defined grace period, is delivered outside an applicable freshness-validation window, or fails freshness or proof-of-possession validation.

8. The system of claim 1, wherein the client-side execution environment compensates for operating-system background-execution suspension, timer coalescing, deferred network-wake events, throttled background timers, network-availability gating, radio-wake policies, low-power-mode restrictions, or other operating-system-imposed execution constraints by deferring cryptographic operations until execution resumes and adjusting continuity assertion timing accordingly.

9. The system of claim 1, wherein the interval or liveness request frequency is dynamically adjustable based on device state, network conditions, user behavior, or server-defined policy, and wherein the client device enforces rate-limiting of continuity assertion generation to prevent excessive cryptographic operations or secure-element queue saturation.

10. The system of claim 1, wherein the continuity assertion includes a response to a server-issued challenge, and wherein the client-side execution environment verifies challenge freshness and delivery context prior to generating the cryptographic proof-of-possession.

11. The system of claim 1, wherein the remote server maintains a rolling sequence number, counter, monotonic timestamp, or other freshness-tracking value associated with continuity assertions to prevent replay, and stores verification events for audit, anomaly detection, or adaptive-authentication evaluation.

12. The system of claim 1, wherein the cryptographic continuity assertion is generated even when a browser tab, application window, or client-side interface associated with the session is inactive, backgrounded, suspended, minimized, closed, operating in a headless mode, or otherwise not in a foreground execution state.

13. The system of claim 1, wherein the client device maintains rollback-resistant monotonic freshness indicators during offline intervals using a secure local buffer, and reconciles the indicators with server-maintained freshness values upon reconnection.

14. The system of claim 1, wherein the continuity assertion includes channel-binding metadata identifying the authenticated delivery channel used for transmission, including primary session channels and secondary or out-of-band communication channels, TLS session identifiers, QUIC connection identifiers, or authenticated push-notification channels.

15. The system of claim 1, wherein the cryptographic continuity assertion is generated using a dedicated background-execution component configured for periodic, event-triggered, server-triggered, or policy-triggered operation, including operation during platform-controlled background-execution windows.

16. The system of claim 1, wherein the client-side execution environment detects an offline state, defers transmission of the continuity assertion until network connectivity is restored, transmits a continuity assertion within the defined grace period upon reconnection, and optionally delivers the continuity assertion over a secondary authenticated communication channel having differing availability or wake characteristics, partial connectivity, or degraded-network conditions.

17. The system of claim 1, wherein the client-side execution environment coordinates continuity assertion generation across simultaneous operational conditions including serialized secure-element execution, background-execution suspension, timer coalescing, deferred network-wake events, intermittent connectivity, and multi-channel authenticated delivery.

18. The system of claim 1, wherein the continuity assertion payload is encrypted using a session-specific symmetric key, ephemeral key, or other negotiated cryptographic material shared between the client device and the remote server, and includes metadata identifying the encryption scheme or key identifier used for decryption.

19. A method for maintaining secure session continuity between a client device and a remote server, the method comprising:

storing, in a hardware-backed or software-based security module, a non-exportable or extraction-restricted cryptographic key, the security module performing cryptographic operations in a serialized manner consistent with exclusive-access execution characteristics;

generating, by a client-side execution environment operating in foreground and background execution states and subject to platform-controlled behaviors such as background-execution suspension, timer adjustments, deferred scheduling, or network-wake constraints, a continuity assertion payload including a timestamp, counter, nonce, monotonic value, or other freshness indicator;

maintaining freshness indicators during offline intervals using mechanisms that preserve monotonic ordering;

obtaining, from the security module, a cryptographic proof-of-possession over the continuity assertion payload, including coordinating secure-element access with user-initiated cryptographic operations and serialized secure-element execution characteristics;

transmitting or embedding, within client-to-server communication, a cryptographic continuity assertion at a predetermined interval or in response to a server-initiated or event-triggered liveness request, including authenticated delivery over one or more communication channels having differing availability, timing, or platform-controlled wake characteristics;

reconciling locally maintained freshness indicators with server-maintained freshness indicators upon reconnection, including transmitting a continuity assertion within a server-defined or otherwise applicable freshness-validation window;

and adjusting session validity at the remote server based on whether a cryptographic continuity assertion is received and satisfies verification and freshness-validation requirements.

20. A non-transitory computer-readable medium storing instructions that, when executed by a processor of a client device, cause the client device to:

store, in a hardware-backed or software-based security module, a non-exportable or extraction-restricted cryptographic key, the security module performing cryptographic operations in a serialized manner consistent with exclusive-access execution characteristics;

generate, within a client-side execution environment capable of foreground and background execution and subject to platform-controlled behaviors such as background-execution suspension, timer adjustments, deferred scheduling, or network-wake constraints, a continuity assertion payload including a timestamp, counter, nonce, monotonic value, or other freshness indicator;

maintain freshness indicators during offline intervals using mechanisms that preserve monotonic ordering;

obtain, from the security module, a cryptographic proof-of-possession over the continuity assertion payload, including coordinating secure-element access with user-initiated cryptographic operations and serialized secure-element execution characteristics;

transmit or embed, within client-to-server communication, a cryptographic continuity assertion at a predetermined interval or in response to a server-initiated or event-triggered liveness request, including authenticated delivery over one or more communication channels having differing availability, timing, or platform-controlled wake characteristics;

reconcile locally maintained freshness indicators with server-maintained freshness indicators upon reconnection, including transmitting a continuity assertion within a server-defined or otherwise applicable freshness-validation window;

and maintain session validity only when the remote server successfully verifies the cryptographic proof-of-possession, evaluates freshness indicators, and evaluates delivery-context information associated with the continuity assertion.

* * * * *